(12) United States Patent  (10) Patent No.: US 9,267,487 B2
Larsen  (45) Date of Patent: Feb. 23, 2016

(54) DEVICE FOR CONVERTING WAVE ENERGY INTO MECHANICAL ENERGY

(71) Applicant: WEPTOS A/S, Fredericia (DK)

(72) Inventor: Tommy Larsen, Ry (DK)

(73) Assignee: Weptos A/S, Fredericia (DK)

( * ) Notice: Subject to any disclaimer, the term of this patent is extended or adjusted under 35 U.S.C. 154(b) by 0 days.

(21) Appl. No.: 14/482,139

(22) Filed: Sep. 10, 2014

(65) Prior Publication Data

US 2014/0377052 A1  Dec. 25, 2014

Related U.S. Application Data

(63) Continuation of application No. 12/866,273, filed as application No. PCT/DK2009/000033 on Feb. 6, 2009, now abandoned.

(30) Foreign Application Priority Data

Feb. 6, 2008  (DK) .................................. 200800166
Feb. 6, 2008  (DK) .................................. 200800167
Jun. 12, 2008  (DK) .................................. 200800811
Jun. 12, 2008  (DK) .................................. 200800812

(51) Int. Cl.
*F03B 13/18*  (2006.01)

(52) U.S. Cl.
CPC ............... *F03B 13/184* (2013.01); *Y02E 10/38* (2013.01)

(58) Field of Classification Search
CPC .......... F03B 13/12; F03B 13/14; F03B 13/16; F03B 13/1825; F03B 13/184; F03B 13/22; Y02E 10/30; Y02E 10/38
See application file for complete search history.

(56) References Cited

U.S. PATENT DOCUMENTS 6,091,161 A * 7/2000 Dehlsen et al. .................. 290/43
7,902,687 B2 * 3/2011 Sauer et al. ...................... 290/54

FOREIGN PATENT DOCUMENTS

WO  WO-2007141363 A1 * 12/2007 .............. F03B 13/14

OTHER PUBLICATIONS

Scott (Popular Science; vol. 234, No. 5; May 1, 1989; p. 125).*

* cited by examiner

*Primary Examiner* — Richard Edgar
*Assistant Examiner* — Juan G Flores
(74) *Attorney, Agent, or Firm* — Fish & Richardson P.C.

(57) ABSTRACT

A wave power plant for extracting energy from the wave movement of a water surface area, which wave power plant comprises a frame construction (1), in which at least two rotors (3, 3*a*) are journalled, and wherein each rotor (3, 3*a*) is suspended in the frame construction (1) to the effect that the water mill wheel (3) is able to rotate about a shaft which is, in the normal use position of the wave power plant, essentially horizontal and is retained in the frame construction (1), and wherein means are provided for maintaining each of the rotors (3, 3*a*) partially immersed into a water surface area. The wave power plant is floating and comprises at least two non-parallel rotor shafts on which at least one rotor (3, 3*a*) is arranged on each rotor shaft.

21 Claims, 4 Drawing Sheets

DEVICE FOR CONVERTING WAVE ENERGY INTO MECHANICAL ENERGY

FIELD OF USE OF THE INVENTION

The present invention relates to a wave power plant for extracting power from the wave movement of a water surface area, said wave power plant comprising a frame construction in which at least two wave rotors are journalled, and wherein each wave rotor is suspended in the frame construction on a rotor shaft which is, in the normal use situation of the wave power plant, essentially horizontal to the effect that the rotors are able to rotate about the rotor shaft which is retained in the frame construction, and wherein means are configured for maintaining each of the rotors partially immersed in a water surface area.

STATE OF THE ART

Today, many different embodiments of wave power plants are known that all share the feature that they utilise the energy which is provided when water is caused to move in a wave movement. A particular category of such wave power plants uses it to advantage that the water at the crest of a wave has a potential energy which is able to drive a rotor in the form of a water mill wheel about an essentially horizontal mill axis when that water is captured in a vane on the one side of the water mill wheel and thus, by means of its body, forces the water mill wheel to rotate. That type of wave power plant excels in being of a relatively simple basic structure with ensuing operational reliability and economy management.

Another type of the above-mentioned wave power plant comprises a number of rotors in the form of float bodies that are also mounted rotatably on a rotor shaft, but rocks in the water surface area as a consequence of the waves influencing the rotors and hence, by their back and forth rotation about the rotor shaft, converting the kinetic energy in the waves into useful energy.

Examples of the former wave power plants are known from eg DK utility model No. 199800152; GB patent No. 1520006; PCT patent application No. WO81/02329; DE patent No. 3904442; DE publication No. 10031310, and PCT application No. 2004/094815. Examples of the latter wave power plants are known from eg GB patent No. 1541572 and U.S. Pat. No. 3,928,967 and are designated a "Duck".

It is a constant challenge in the development of wave power plants to optimize the amount of energy that can be extracted from the plant, a commercial penetration of such wave power plants presupposing to a certain extent that, in particular financially, they are able to compete with already existing renewable-energy plants, such as wind turbines and the like.

OBJECT OF THE INVENTION

Based on the above, it is therefore the object of the present invention to provide a wave power plant of the kind described above and by which an efficient utilisation is provided of the available wave energy.

This is accomplished by a wave power plant of the kind described above and which is characterised in that the wave power plant is a floating construction that comprises at least two non-parallel water mill shafts wherein at least one rotor is arranged on each rotor shaft As it is, this enables that, at all times, the wave power plant will position itself such that the distance of the rotor shafts relative to each other will be increased in the direction of propagation of the waves, whereby an angle relative to the wave propagation direction will be imparted to the rotor shafts which is considerably larger than 0 degrees. Thereby it is ensured that the capacity of the individual rotors is utilised optimally, the rotors not being arranged behind each other relative to the direction of propagation of the waves, and, on the other hand, it is possible to adapt the angle such that the capacity of the rotors use utilised optimally relative to the wave height and distance that prevails at a given position.

The wave power plant is particularly suitable for floating on a water surface as the frame construction may thereby conveniently comprise a single anchoring site configured for mooring the wave power plant, and wherein the frame construction is configured such that it retains the two non-parallel rotor shafts in such a manner that the distance between the rotor shafts is increased with the distance from the anchoring site.

Optimal utilisation of the wave power plant can be achieved if the frame construction is configured for maintaining an angle between the two rotor shafts, said angle being between 10 degrees and 170 degrees and preferably between 45 degrees and 135 degrees. Thereby it is ensured, on the one hand, that the energy extraction of the plant can be optimised, while simultaneously the plant has good rejecting properties in relation to floating objects on the water surface area, and, additionally, it can be adapted to specific wave conditions.

In this context, the frame construction further advantageously comprises means for regulating the angle between the two rotor shafts, it thereby being possible to adapt the angle between the rotor shafts to the current conditions prevailing at any time, such as weather conditions and the rate of propagation of the waves, wave height and distance.

According to an advantageous embodiment, the frame construction comprises two separate, elongate frame constructions, each of which has a first end in proximity of the anchoring site, and another end which is arranged at a distance from the anchoring site, and wherein each of the separate, elongate frame constructions is configured for retaining a rotor shaft with rotors, and wherein, between the first end and the second end, between the two separate, elongate frame constructions, at least one actuator is configured for adjusting and maintaining the distance between the two separate, elongate frame constructions.

In this context, the two separate, elongate frame constructions may advantageously, at their first end, be hinged to each other by means of a hinge device which has an essentially vertical hinge axis relative to the use position of the wave power plant. Hereby it is made possible to use only one single actuator for regulating the angle between the rotor shafts.

In this context, it will further provide a stable positioning of the wave power plant on the water surface area if the hinge device comprises the anchoring site.

In prolongation thereof, the one of the two separate, elongate frame constructions may advantageously be mounted in such a manner on the hinge device that it is able to rotate about an axis which is, in the use position of the wave power plant, essentially horizontal relative to the hinge device. Hereby it is avoided that the two separate frame constructions are twisted relative to each other if they are influenced by adverse forces, eg as a consequence of wake swells from a ship that travels past the wave power plant.

Advantageously, the separate lattice structures may further be combined from two or more rotor modules that each comprises a frame and a rotor shaft, and wherein, additionally, the rotor modules are provided with retaining means that are configured with a view to mounting the rotor modules to each other in such a manner that the rotor shafts extend in prolongation of each other. Hereby it is obtained that it is easy to build wave power plants with different numbers of rotor modules independently of current space conditions and desired power output.

Further utilisation of power can be obtained if the wave power plant further comprises one or more ballast tanks and associated pumps that are configured for filling the ballast tanks with and emptying them of water. Hereby it is possible to regulate the lift of the plant in response to the current wave conditions to the effect that the rotors can be kept immersed into the water surface area in a desired depth with a view to adapting or optimising their efficiency.

LIST OF FIGURES

EMBODIMENT OF THE INVENTION

Figure 1:
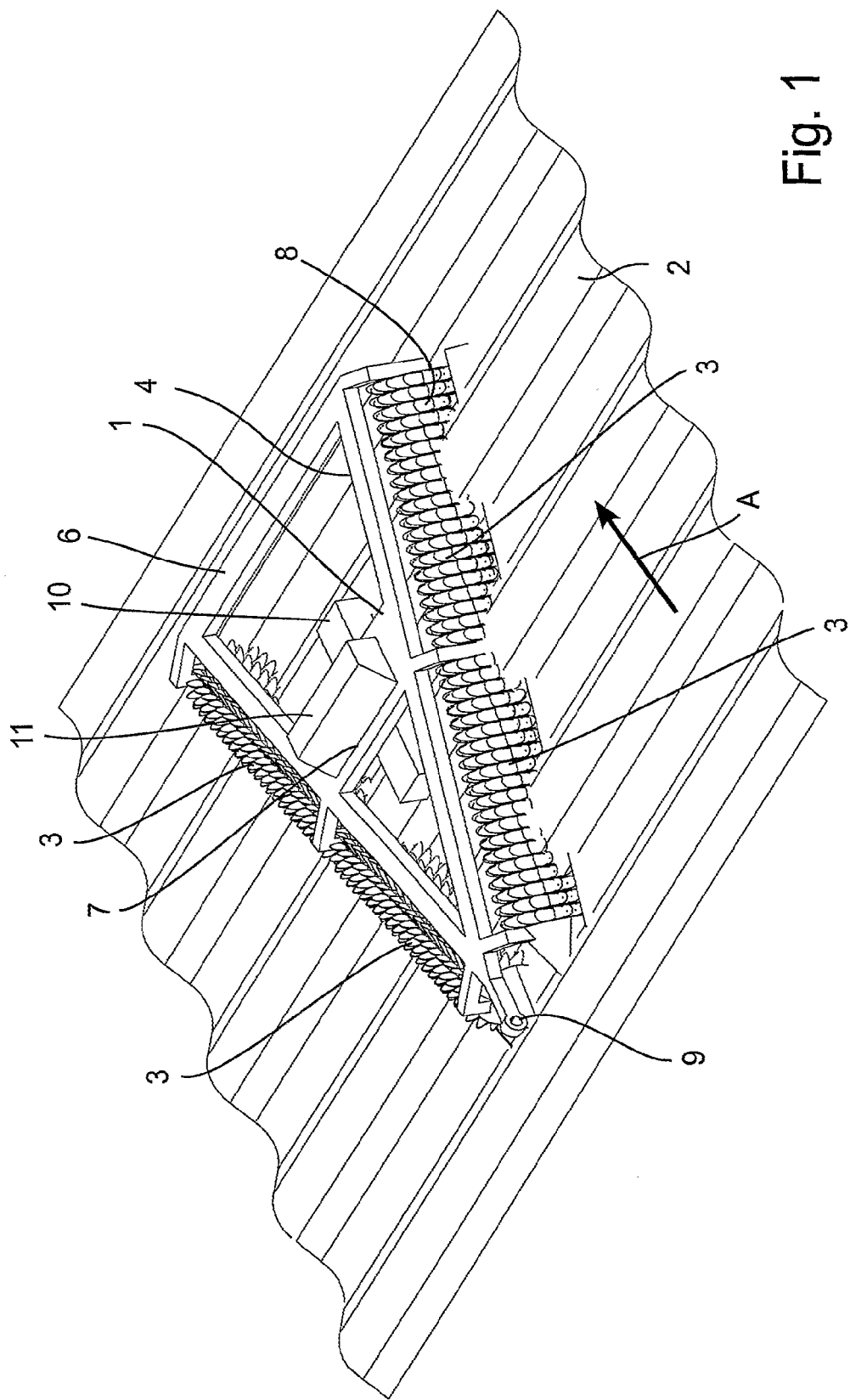
FIG. 1 is an explanatory sketch showing an alternative embodiment of a wave power plant according to the present invention partially immersed into a water surface level and seen in an inclined view from the top.

Thus, FIG. 1 shows an embodiment of a wave power plant according to the present invention and wherein the wave power plant is a floating structure, here shown floating on the water surface area 2 where a number of waves have a direction of propagation as indicated by the arrow A to show the mode of operation of such wave power plant. Here the wave power plant has four rotors in the form of water mill wheels 3 that are all partially immersed into the water surface area 2. Those water mill wheels 3 are retained rotatably by means of a not shown shaft relative to the frame construction 1 of the wave power plant, which comprises two beams 4 and 5 that are essentially parallel to the not shown rotor or water mill shafts and that are retained at a fixed angle of 60 degrees relative to each other by means of the transverse booms 6 and 7.

The water mill wheels 3 all being provided with an abundant amount of vanes or dishes 8 that all face with their opening upwards on the side of the water mill wheels that faces towards the direction of propagation A of the waves, the vanes 8 will be filled with water when the water level rises due to a wave crest passing, and then the water-filled vanes 8 will pull the water mill wheels 3 around when the water level falls following passage by the wave crest of a given vane 8.

According to the present invention the frame construction 1 is, as mentioned above, configured such that it maintains an angle between the water mills shafts that carry the water mill wheels 3 such that the water mill shafts are not parallel, and thereby it is ensured, on the one hand, that all the vanes 8 on the water mill wheels 3 are used efficiently, the vanes 8 not being arranged in each other's wake, and, on the other hand, the angle between the two beams 5 and 6 and hence the not shown water mill shafts mean that the wave power plant will only to a low degree be influenced by floating objects that may float into the water mill wheels 3, simultaneously with fairly continuous operation of the plant being obtained due to an essentially constant influence of momentum on the water mill shaft from the water wheels 3.

Here the wave power plant is configured as a floating structure that can be anchored to eg a seabed underneath the water surface area 2. To that end a mooring point is arranged in the form of an anchorage eyelet for retaining a not shown mooring 25. The anchorage eyelet being arranged at that end of the wave power plant where the distance between the rotor shafts is the shortest, this will mean that the wave power plant will be able to turn about its mooring to the effect that it will, at all times, settle in a position that ensures that it utilises the wave energy optimally.

The highest output efficiency for wave power plants of this type is achieved when the water mill wheels 3 are immersed so far into the water surface area that the water mill shaft has essentially the same height as the mean wave height in the water surface area 2. However, since it is not always the case that the mean wave height is precisely equal to the mean value of the height of the water level at the wave crest and the wave trough, the invention is configured with a ballast tank 10 and a not shown pump configured in the pump housing 11, and wherein the pump is configured for filling and emptying the ballast tank 10 with water with a view to changing the weight of the wave power plant and/or its lift to the effect that it is possible to optimise the output efficiency of the plant in accordance with the current wave conditions.

Figure 2:
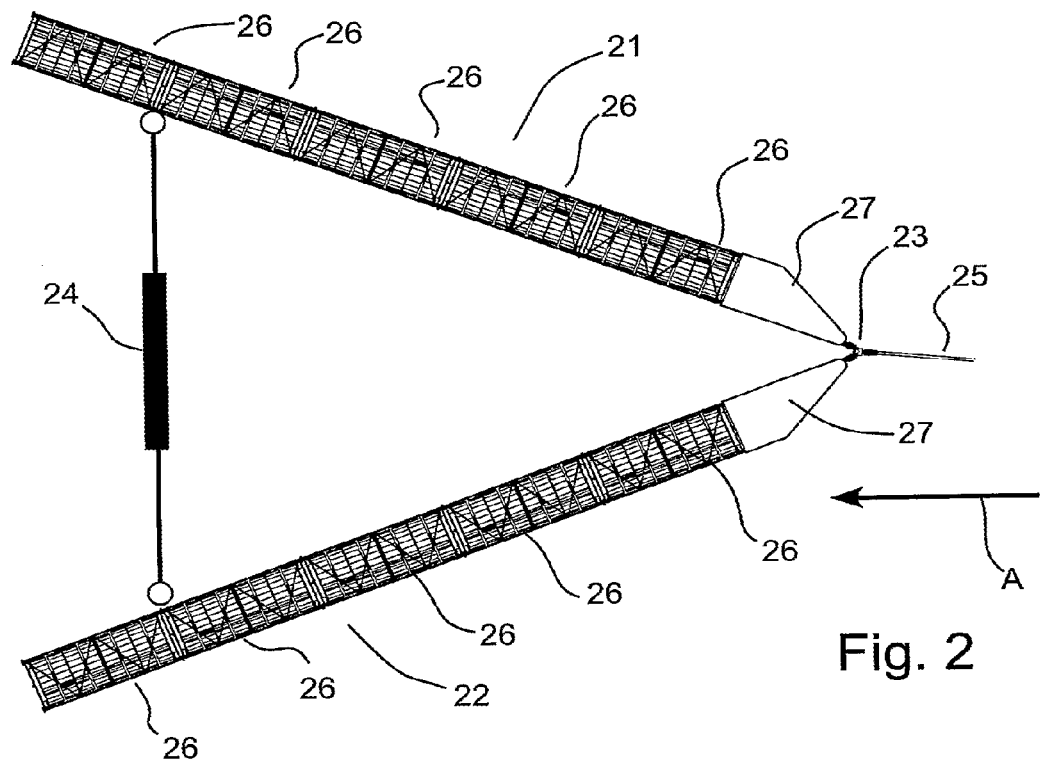
FIG. 2 is an explanatory sketch showing an alternative embodiment of a wave power plant according to the present invention, seen straight from above.

Now, FIG. 2 shows an alternative embodiment of a wave power plant according to the present invention and which is also a floating structure floating on the water surface area where waves are present that propagate in the direction of the arrow A. That wave power plant comprises two elongate, separate frame constructions 21, 22 that are hinged to each other via a hinge 23 which is shown in detail in FIG. 6, said hinge also functioning as anchoring point for a mooring 25. Thereby the two separate frame constructions 21, 22 may be arranged according to choice at a mutual angle, and to that end a linear actuator 24 is configured, such as a hydraulic cylinder or a mechanical spindle. The person skilled in the art being able to naturally suggest different embodiments of drive systems for such linear actuators, they will not be shown in the figures.

By adjusting the length of the linear actuator 24, the angle between the two separate frame constructions 21, 22 can be adjusted manually or automatically as needed to the effect that the angle can be optimised with a view to obtaining the highest possible output effect or with a view to ensuring against breakdowns in stormy conditions or other. In a not shown alternative plant the hinge 23 could be replaced by a further linear actuator that could thereby cooperate with the first linear actuator with a view to adjusting and maintaining a desired angle between the two separate frame constructions 21, 22.

Alternatively the angle can be adjusted in that, instead of the linear actuator, a bar-shaped construction is configured with an essentially fixed length, and wherein the bar-shaped construction is, at each end, secured to a carriage, and each of which carriages is arranged such that they can be displaced along the separate frame constructions 21, 22. By shifting the carriages in a direction towards the hinge 23, it is thereby possible to increase the angle between the two separate frame constructions 21, 22, whereas the angle is reduced when the carriages are shifted away from the hinges.

Figure 3:
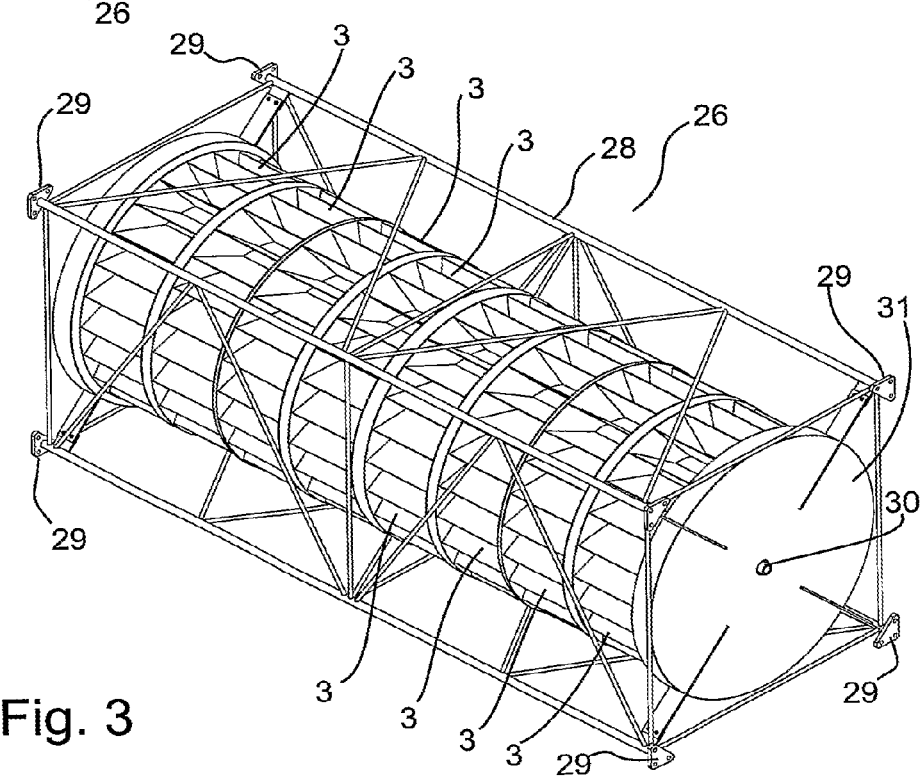
FIG. 3 is a sketch showing a component partaking in the wave power plant shown in FIG. 2, seen in an inclined view from the front.

As will appear from FIG. 2, each of the two separate frame constructions is made as an elongate structure comprising a number of mill modules 26 of which one of such modules is shown in enlarged view in FIG. 3. The mill modules 26 are assembled in prolongation of each other to the effect that the water mill shafts 30 in the mill modules 26 are connected to each other in prolongation of each other, and wherein the water mill shaft on the first mill module, seen from the hinge 23, is coupled to an essentially watertight machine housing 27, in which the water mill shaft is coupled to eg a generator, a pump, a gear or other aggregate that can be driven by the momentum that is transferred to the water mill shaft via all the water mill shafts 3 in the separate frame construction 21, 22. Thus, it is possible to configure the machine housing 27 with the components that are needed to extract the energy which, via the water mill wheels 3, are transferred to the water mill shaft, and, thus, the wave power plant can be used for generating electric current via eg a generator or for other purposes, such as for pumping a fluid medium by means of a pump. The person skilled in the art being able to point to many different embodiments of how the rotation and momentum of the water mill shaft can be used for generating useful energy, the figures do not show details of that part of the wave power plant.

As will appear from FIG. 3, each of said mill modules 25 are constituted by a lattice structure 28 which is configured such herein that it encloses the water mill wheel 3. Hereby a very simple and rigid construction is obtained without the lattice structure 28 exercising significant influence on the waves in the water. The lattice structure is provided with mounting plates 29 at each end of the lattice structure 28 allowing two or more lattice structures 28 to be assembled in prolongation of each other.

The water mill shaft 30 in the water mille module 26 protruding, it is, as mentioned above, possible to assemble the water mill shafts 30 of several mill modules 26 mounted in prolongation of each other to form a long, assembled water mill shaft that is able to transmit momentum from all the water mill wheels to the engine housing 27.

From FIG. 3 it will further appear that the mill module 26 is provided with ballast tanks 31 that can, via not shown pumps and conduits configured to that end, be filled with or emptied of water to regulate the lift and/or weight of the wave power plant.

Figure 4:
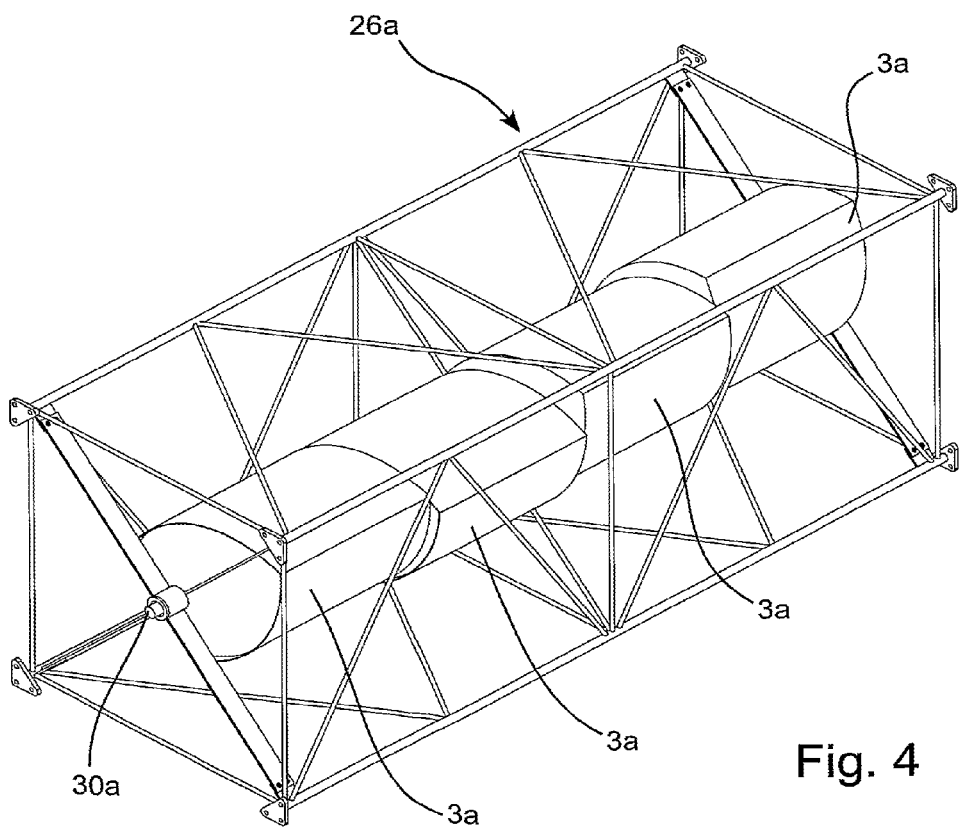
FIG. 4 is a sketch showing a partaking component in the same manner as in FIG. 3, but wherein the rotors are configured alternatively.

Now, FIG. 4 shows an alternative embodiment of the invention where, instead of water mill wheels as shown in FIG. 3, the mill module 26a comprises a number of rotors 3a that are mounted on a rotor shaft 30a. Each of the rotors has a lift and a shape which are asymmetrical about the rotor shaft 30a to the effect that, when the waves hit the rotor 3a, it is forced to rotate about the rotor shaft 30a and hence to rotate the rotor shaft. This type of rotor is commonly known from eg GB patent No. 1541572 and U.S. Pat. No. 3,928,967 and is designated a "Duck" and has particularly good properties with regard to output efficiency. Additionally, it will be obvious to the person skilled in the art that the present invention as described herein can be used in the context of rotors of various configurations without thereby departing from the fundamental principle on which the invention relies.

Figure 5:
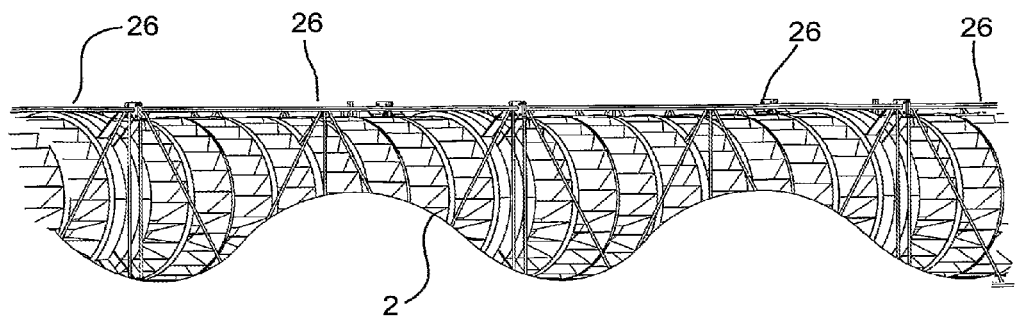
FIG. 5 is a sketch showing a section of the wave power plant shown in FIG. 2, partially immersed in a water surface area and seen from the front.

Now, FIG. 5 shows a section of one of the separate frame constructions 21, 22 comprising several wave modules 26 assembled in prolongation of each other and partially immersed in a water surface area 2.

Figure 6:
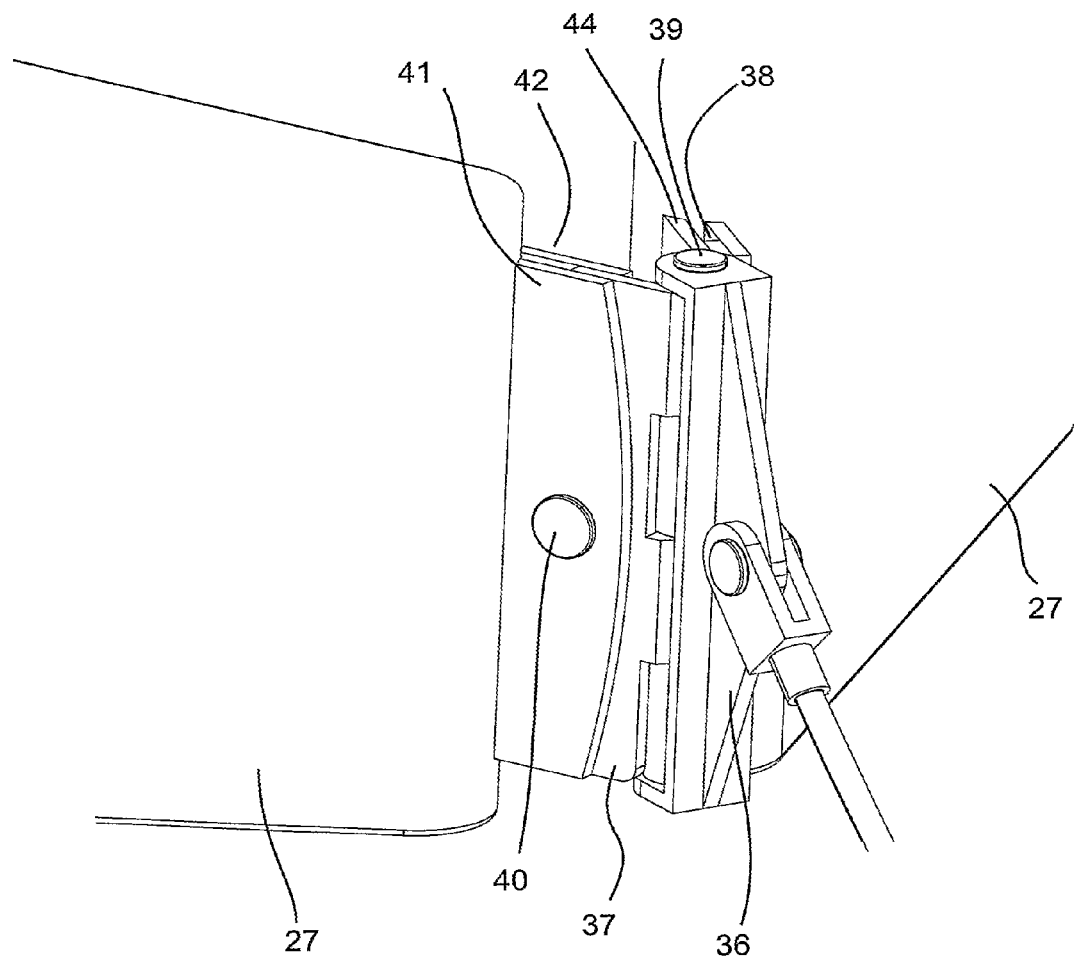
FIG. 6 is a detailed sketch showing a detail component of the wave power plant shown in FIG. 3.

FIG. 6 shows a detailed part of the wave power plant shown in FIG. 3 and which is in the form of the hinge 23 on which the two separate frame constructions 21, 22 are mounted via the machine housings 27. Thus, the hinge comprises three hinge plates 36, 37, 38 that are all able to rotate about a common hinge axis 39. The one hinge plate 36 is provided with an anchoring eyelet for securing the mooring 25. The two other hinge plates 37, 38 are secured to each their machine housing 27 in that they are introduced between flanges 41, 42 on the one machine housing 27 or between flanges 43, 44 on the other machine housing 27. Since they are secured to each their machine housing 27 by means of a bolt 40 that forms an axis of rotation allowing the machine housings 27 to rotate in the vertical plane relative to the hinge 23, seen in the normal use position of the wave power plant, and such that any heterogeneous movement patterns in the two separate frame constructions 21, 22 and hence in the machine housings 27 are absorbed in the hinge 23.

The invention claimed is:

1. A wave power plant for extracting power from the wave movement of a water surface area, said wave power plant comprising a frame construction in which at least two rotors are journalled, and wherein each rotor is suspended in the frame construction on a rotor shaft which is, in the normal use situation of the wave power plant, essentially horizontal to the effect that the rotor is able to rotate about the rotor shaft which is retained in the frame construction, and wherein means are configured for maintaining each of the rotors partially immersed in a water surface area, wherein the wave power plant is a floating structure that comprises at least two non-parallel rotor shafts wherein at least one rotor is arranged on each rotor shaft, the at least two non- parallel rotor shafts are arranged in two elongate, separate frame constructions that are hinged to each other via a hinge, the hinge also functioning as a single anchoring point for a mooring, and wherein the frame construction comprises means for regulating the angle between the two rotor shafts.

2. A wave power plant according to claim 1, wherein the wave power plant is configured for floating on a water surface area, and wherein the frame construction comprises an anchoring point configured for mooring the wave power plant, and wherein the frame construction is configured such that it retains the two non-parallel rotor shafts in such a manner that the distance between the rotor shafts is increased with the distance to the mooring point.

3. A wave power plant according to claim 2, wherein the frame construction is configured for maintaining an angle between the two rotor shafts, said angle being between 45 degrees and 135 degrees.

4. A wave power plant according to claim 3, comprising one or more ballast tanks and associated pumps that are configured for filling the ballast tanks with water and emptying them thereof.

5. A wave power plant according to claim 2, wherein, it comprises one or more ballast tanks and associated pumps that are configured for filling the ballast tanks with water and emptying them thereof.

6. A wave power plant according to claim 2, comprising one or more ballast tanks and associated pumps that are configured for filling the ballast tanks with water and emptying them thereof.

7. A wave power plant according to claim 1, wherein the frame construction comprises two, separate, elongate frame constructions, each of which has a first end in proximity of the anchoring site and a second end which is arranged at a distance from the anchoring site, and wherein each of the separate, elongate frame constructions is configured for retaining a rotor shaft with rotors, and wherein, between the first end and the second end, between the two separate, elongate frame constructions, at least one device is configured for adjusting and maintaining the distance between the two separate, elongate frame constructions.

8. A wave power plant according to claim 7, wherein two separate, elongate frame constructions may advantageously, at their first end, be hinged to each other by means of a hinge device which has an essentially vertical hinge axis relative to the use position of the wave power plant.

9. A wave power plant according to claim 8, wherein the hinge device comprises the anchoring site.

10. A wave power plant according to claim 9, wherein at least one of the two separate, elongate frame constructions is mounted in such a manner on the hinge device that it is able to rotate about an axis which is, in the use position of the wave power plant, essentially horizontal relative to the hinge device.

11. A wave power plant according to claim 9, wherein each of the separate frame constructions is combined from two or more rotor modules that each comprises a frame and a rotor shaft, and wherein, additionally, the rotor modules are provided with retaining means that are configured with a view to mounting the rotor modules to each other in such a manner that the rotor shafts extend in prolongation of each other.

12. A wave power plant according to claim 9, comprising one or more ballast tanks and associated pumps that are configured for filling the ballast tanks with water and emptying them thereof.

13. A wave power plant according to claim 8, wherein at least one of the two separate, elongate frame constructions is mounted in such a manner on the hinge device that it is able to rotate about an axis which is, in the use position of the wave power plant, essentially horizontal relative to the hinge device.

14. A wave power plant according to claim 13, wherein each of the separate frame constructions is combined from two or more rotor modules that each comprises a frame and a rotor shaft, and wherein, additionally, the rotor modules are provided with retaining means that are configured with a view to mounting the rotor modules to each other in such a manner that the rotor shafts extend in prolongation of each other.

15. A wave power plant according to claim 13, comprising one or more ballast tanks and associated pumps that are configured for filling the ballast tanks with water and emptying them thereof.

16. A wave power plant according to claim 8, wherein each of the separate frame constructions structures is combined from two or more rotor modules that each comprises a frame and a rotor shaft, and wherein, additionally, the rotor modules are provided with retaining means that are configured with a view to mounting the rotor modules to each other in such a manner that the rotor shafts extend in prolongation of each other.

17. A wave power plant according to claim 8, comprising one or more ballast tanks and associated pumps that are configured for filling the ballast tanks with water and emptying them thereof.

18. A wave power plant according to claim 7, wherein, each of the separate elongate frame structures is combined from two or more rotor modules that each comprises a frame and a rotor shaft, and wherein, additionally, the rotor modules are provided with retaining means that are configured with a view to mounting the rotor modules to each other in such a manner that the rotor shafts extend in prolongation of each other.

19. A wave power plant according to claim 18, comprising one or more ballast tanks and associated pumps that are configured for filling the ballast tanks with water and emptying them thereof.

20. A wave power plant according to claim 7, comprising one or more ballast tanks and associated pumps that are configured for filling the ballast tanks with water and emptying them thereof.

21. A wave power plant for extracting power from the wave movement of a water surface area, said wave power plant comprising a frame construction in which at least two rotors are journalled, and wherein each rotor is suspended in the frame construction on a rotor shaft which is, in the normal use situation of the wave power plant, essentially horizontal to the effect that the rotor is able to rotate about the rotor shaft which is retained in the frame construction, and wherein means are configured for maintaining each of the rotors partially immersed in a water surface area, wherein the wave power plant is a floating structure that comprises at least two non-parallel rotor shafts wherein at least one rotor is arranged on each rotor shaft and wherein the frame construction comprises means for regulating the angle between the two rotor shafts, the wave power plant is configured for floating on a water surface area, and wherein the frame construction comprises an anchoring point configured for mooring the wave power plant, and wherein the frame construction is configured such that it retains the two non-parallel rotor shafts in such a manner that the distance between the rotor shafts is increased with the distance to the mooring point, wherein the frame construction is configured for maintaining an angle between the two rotor shafts, said angle being between 45 degrees and 135 degrees.

* * * * *